Sept. 20, 1932.   N. LOMBARD   1,878,944
VACUUM BRAKE
Filed Jan. 3, 1929   2 Sheets-Sheet 1
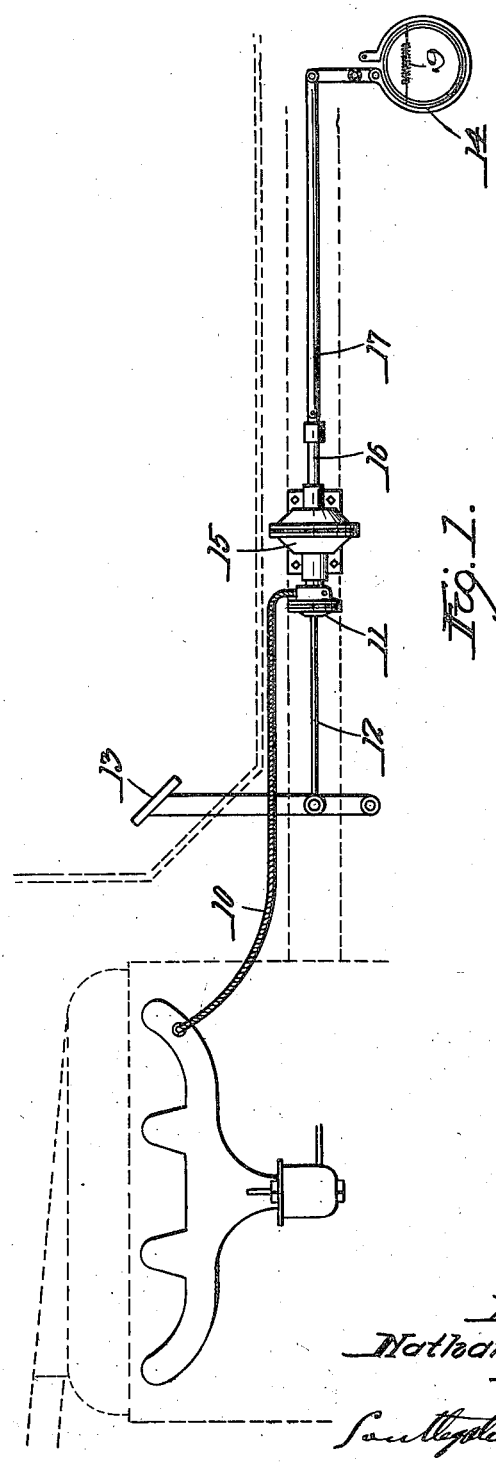

Sept. 20, 1932.  N. LOMBARD  1,878,944
VACUUM BRAKE
Filed Jan. 3, 1929  2 Sheets-Sheet 2
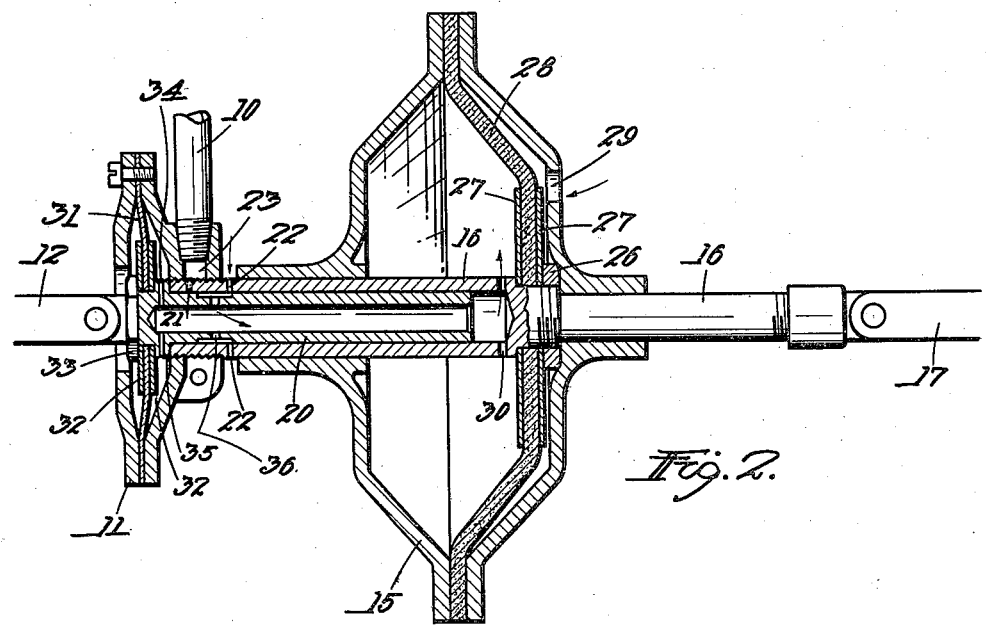
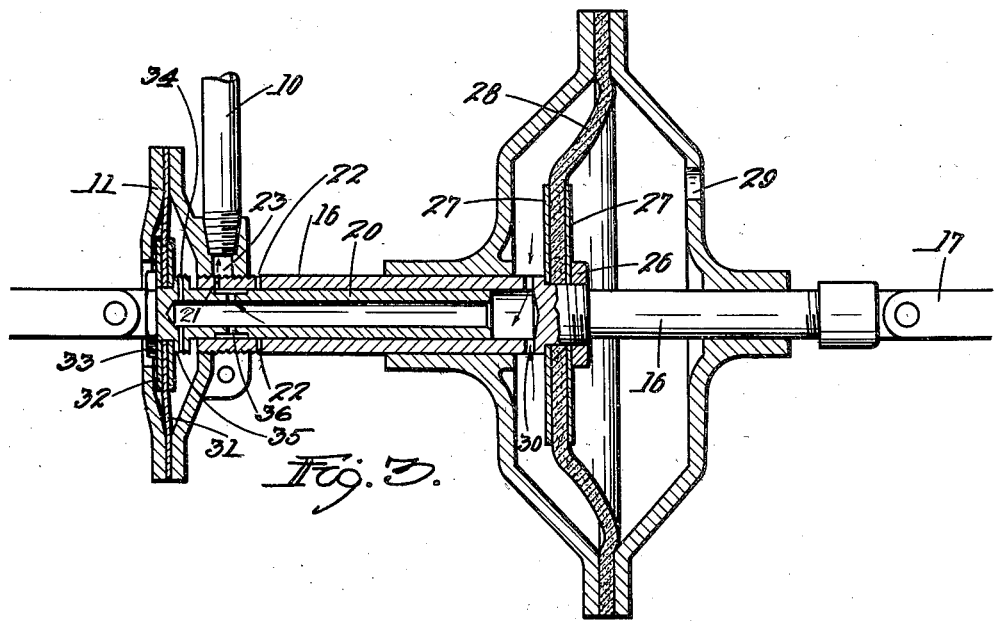

Patented Sept. 20, 1932

1,878,944

UNITED STATES PATENT OFFICE

NATHANIEL LOMBARD, OF WORCESTER, MASSACHUSETTS

VACUUM BRAKE

Application filed January 3, 1929. Serial No. 330,054.

This invention relates to a vacuum brake designed especially for automobiles and the like, but capable of other applications.

The principal objects of the invention are to provide a simplified form of vacuum brake, cheap to manufacture, in which no springs, cranks or tight fitting pistons are employed or adjustments for wear or re-setting required; to provide a construction in which the parts can not get out of proper relation or alignment during reciprocation; to provide a construction whereby the action and sensation of the operator in applying the brakes will be of the same character as he experiences in applying the ordinary brakes of the mechanical or oil types, but in which the force used by him as he applies them is very much reduced; to provide a construction in which the breaking force is wholly the pressure of air on the apparatus, none of it being foot pressure; and yet in which, should there be temporary failure of the source of vacuum, the brakes may still be applied mechanically by the usual action of the foot in depressing the pedal.

Other objects and advantages of the invention will appear hereinafter.

Reference is to be had to the accompanying drawings in which

Fig. 1 is a side view showing an engine and brake diagrammatically and illustrating the connection of a preferred form of this invention thereto;

Fig. 2 is a central sectional view of the vacuum brake operating device showing it in the "off" position; and Fig. 3 is a similar view showing it in the working position.

In my Patent No. 535,952, granted March 19, 1895, I have shown a brake operating device in which the brake is applied through a piston and cylinder. The piston is controlled by a valve operated by a hand lever connected with the valve and with the brake rod in such a manner that after the hand lever has been operated, if the valve does not open or if no fluid passes through it, the brake can still be operated in a mechanical manner by the further turning of the hand lever in the same direction, without the assistance of the piston. Also, after the brake is set by operation of the valve and the valve closes, the parts are left in such position that the hand lever can be pushed further around in the same direction to set the brake harder. I take advantage of these principles in this invention.

As shown in Fig. 1, the brake operating means comprises a flexible hose or pipe 10 connected with the intake manifold, and thus with the suction of the engine. This hose is connected with a casing and controls the connection of the suction with the operating part of the device, which constitutes a part of the brake operating mechanism, and to which is connected a rod 12 operated by the ordinary foot pedal or operating lever 13. The end of the pipe 10 is supported by a bracket which is carried by a casing 11.

The brake operating means comprises a compound loose link inserted in the rod connection between the pedal ordinarily used for braking purposes and the rigging for operating the brake 14. This loose link has mounted upon it two casings, one, 15, large and a smaller one 11. The link is composed of a round rod 16 bored out for about half its length, and a second round hollow rod 20 closed at one end and provided with a link eye connected with the rod 12, the other end being turned to fit and slide freely in the bored out portion of the rod 16.

The rod 20 carries near its outer end a collar 35 and also a small flexible diaphragm 31, called the auxiliary diaphragm, mounted between two metal plates 32 which are compressed against the collar 35 by a nut 33 screwed on the rod. The diaphragm 31 is clamped around its circumference between the elements of the casing 11, which casing is screwed on the left hand end of the tubular part of the rod 16, thereby serving, amongst other purposes, to limit narrowly the slack motion of the rod 20 within the rod 16. Free motion to the left is finally stopped by the contacting of one metal plate 32 with the casing (as in Fig. 3), and free motion to the right is finally stopped by the collar 35 contacting with the end of the tubular rod 16 as in Fig. 2. Thus a port 21 is closed in Fig. 2 and open in Fig. 3.

The rod 16 is provided at its right hand end with an eye member, by which it can be attached to the brake rigging 17. At its central part is the casing 15 supporting a diaphragm 28, called the large, or motive, diaphragm. This motive diaphragm is attached to the rod 16 by means of a couple of metal discs 27, and all are clamped together by a check-nut 26. The pedal side of the casing is closed in, substantially air tight, while the right-hand side of the diaphragm is freely acted upon by the atmospheric air admitted through an opening 29. The casing 15 is secured by any approved method to a fixed point on the car body and the rod 16, though fitting the hole in the casing, is capable of being moved freely back and forth in it with a motion limited by the possible motion of the brake rod. Such a free fit is consistent with a sufficient degree of air tightness to hold the necessary degree of vacuum in the left-hand side of the diaphragm.

The auxiliary diaphragm 31 has for its principal objects
(a) the provision of a resistance to the depression of the pedal proportional to its angular motion, and
(b) the provision of automatic means for releasing the brakes when the pedal is raised.

The right hand side of the casing 11 contains a chamber 23 which is the terminus of a flexible tube connecting the engine intake manifold, through a port 21 cut through the tube 16, with the surface of the tube 20. An adjacent port 22 is cut through the tube 16, just outside the wall of the chamber 23. The sliding tube 20 is provided with a broad shallow circumferential groove cut on its surface wide and deep enough to permit, at one end of its travel, only port 21 to be connected through a port 36 with the inside of the central tube 20, as shown in Fig. 3. At the other end of the travel of the tube 20 only the port 22 communicates with the port 26 as shown in Fig. 2. At the center of its travel both ports 21 and 22 are closed. The tube 20 connects with the insides of the casings 11 and 15 through ports 34 and 30 respectively and is obviously a piston valve.

When either setting or releasing the brakes by means of the vacuum in chamber 23, it is the sole function of the foot to move this piston valve 20 to the left or right, as will appear from the following analysis:

When the auxiliary diaphragm 31 is in its middle position and the ports 21 and 22 are therefore closed the vacuum in chamber 23 can have no effect upon the braking. To give the vacuum braking effect it is necessary to depress the brake pedal, thereby moving the piston valve 20 to the left far enough to open the port 21 to the diaphragms as described above. The air will immediately lower its pressure on the right-hand side of the auxiliary diaphragm 31 and on the left hand side of the motion diaphragm 28 and bring into action the following forces on the brake rigging:

1. The unblanced air pressure on the right side of the casing of the smaller diaphragm 31,
2. The unbalanced air pressure on the right side of the larger diaphragm 28, and
3. The holding back resistance of any brake springs 9 acting on the brake bands or pedal.

This position is shown in Fig. 3.

The reduction of pressure causes a motion of the rod 16 toward the pedal, due mainly to the unbalanced pressure on the right-hand side of the diaphragm 28, and this motion will continue only until the port 21 has been again covered by the piston valve 20. Further change in the degree of vacuum will of course cease if no additional downward pressure and motion of the foot takes place, and the brakes may remain as set indefinitely, within very narrow limits of brake pressure; for the most minute slacking up of the brake rod pull, due to a minute right-hand creeping motion of the tube 16, relatively to the piston valve 20, will re-admit the suction from the chamber 23 to the inside of the valve 20 and therefore permit the air pressure on the right-hand side of the diaphragm 28 to re-establish the former brake rode pull. Any further pressure on the pedal by the foot will be accompanied by an increased movement to the left of the piston valve 20, reconnecting the ports 21 and 36. This permits a further exhaustion of the air on the left-hand side of the diaphragm 28 and hence an increased pull on the brakes, and similar increased effects will follow further depression of the pedal, the braking effect being proportional in some degree to the pedal movement.

The unbalanced air pressure on the right-hand side of the motive diaphragm 28 is, however, though the main, not the only source of power for setting the brakes. The diminution of pressure in the vacuum chamber on the right-hand side of the auxiliary diaphragm 31 provides an additional force acting on the rod 16; namely, the unbalanced portion of the atmospheric air pressure on the right hand side of the casing 11. Although the atmospheric pressure is exerted on the left side of the auxiliary diaphragm 31, the fact that part of this load is carried by the foot will prevent the transmission of some of this pressure to the casing 11. The atmospheric pressure on the right side of the casing 11, therefore, is unbalanced and the casing will assist pulling the rod 16 to the left and applying the brake, while the pedal is held in any one position.

As the foot of the operator does not at any time push or pull against the resistance of the brakes themselves after a vacuum has been established in the chamber 23, and as it is desirable to provide a variable resistance to the motion of his foot when setting them, which resistance shall be proportional to the braking effect, the flexible auxiliary diaphragm 31 is provided for that purpose, as well as for the dual purpose of effecting the movement of the piston valve 20 to the right upon the release of the pedal by the operator. This latter movement admits atmospheric air to the vacuum chambers of both casings, thereby balancing the pressure on each side of each diaphragm and thus releasing the brakes.

It is apparent, therefore, that the psychological sensations of the operator, when setting and releasing the brakes by the application of this vacuum device, are not different in kind but only in amount from what they would be if he were setting the brakes without the assistance of the diaphragms. The foot feels and balances only the increase in air pressure on the diaphragm 31 due to the vacuum in the small chamber. The brakes get all of the increased pull due to the vacuum in both chambers. The foot has only to move the piston valve 20 in either direction and exerts no pull on the brake rigging. The relative positions of ports 21 and 36 are such that the movement of the larger diaphragm induced by changes of pressure in the vacuum chamber, causes the rod 16 to continually overtake each new position of the piston valve 20, whether the valve 20 be advancing to the left or retreating to the right, and thereby prevents the actual contacting of the metal plates 32 with either side of the casing 11, in whichever direction it may be moving. In the absence of the vacuum in chamber 23, however, the foot alone can move the brake rodding and set or release the brakes, all that is necessary being to first take up this slack motion of the plates 32 within the casing 11.

Although I have illustrated and described only one form of the invention I am aware of the fact that modifications can be made therein by any person skilled in the art without departing from the scope of the invention as expressed in the claims. Therefore I do not wish to be limited in this respect but what I do claim is:—

1. In a vacuum brake, the combination with a brake and a brake rod connected therewith, of a pedal, a diaphragm casing, one side of which is adapted to be connected with the suction side of an internal combustion engine and the other always open to the air, a flexible diaphragm in said casing, a hollow valve connected with the diaphragm to move therewith and having a port adapted to be exposed to the suction when the pedal is moved to apply the brake, a second diaphragm chamber having a diaphragm therein connected positively with the brake rod, said chamber being open to the air on one side and communicating with the interior of said valve on the other side, whereby when the valve communicates with the suction of the engine, the second diaphragm will be operated by the greater air pressure on the other side to apply the brake.

2. In a vacuum brake, the combination with a brake and a brake rod connected therewith, of a pedal, a valve slidingly connected with the brake rod and connected with the pedal to be operated thereby, a diaphragm casing, one side of which is connected with the interior of said valve and the other open to the air, a flexible diaphragm in the casing fixed to the valve, whereby the operation of the pedal will displace the diaphragm, the valve having a port adapted to be exposed to the suction from an internal combustion engine when the pedal is moved to apply the brake, a larger diaphragm chamber having a diaphragm therein connected positively with the brake rod at its center, said chamber being open to the air on one side and the other side communicating with the interior of said valve, whereby when the port communicates with the suction of the engine, the larger diaphragm will be operated by the suction on one side and air pressure on the other to apply the brake.

3. In a vacuum operating means for a brake, the combination with the brake and its brake rod, said brake rod being hollow at its end, of a hollow valve open at one end and closed at the other, said valve being slidably located within the hollow part of the brake rod and having a port therein, a diaphragm casing mounted in fixed position, a diaphragm in said casing positively connected to the brake rod, one side of the casing being open to the air, said hollow part of the brake rod having three ports through its wall, one communicating with the air, another with a source of vacuum and the third with the closed side of the casing, one edge of the port in the valve being so located on it that motion of the valve to that side will cause communication between the air port and its closed side of the casing and the other edge of the port being so located on the valve that motion to that side will both shut off connection with the outer air and open communication with the suction of the engine, by which valve motion, therefore, the brake may be set by, or released from, unbalanced air pressure.

4. In a vacuum brake, the combination with the brake rigging, its operating rod, and an operating pedal, of two casings, fluid operated members therein, one of which is connected to the operating rod and the other to the operating pedal, the brake operating rod leaving a hollow part provided with a suction port and a vent port spaced apart along its wall, the suction port being connected with the inlet of an internal combustion engine manifold, a hollow sliding valve in said hollow part connected to move with the pedal and having a groove around it of a length less than the distance between said ports and connected with the interior of the valve, whereby a little motion of the valve in either direction from neutral will open one of said ports, and means for connecting the inside of the valve with the inside of the casing which has its fluid operated member connected to the operating rod.

In testimony whereof I have hereunto affixed my signature.

NATHANIEL LOMBARD.